(12) United States Patent
Journade

(10) Patent No.: US 8,336,827 B2
(45) Date of Patent: Dec. 25, 2012

(54) METHOD AND DEVICE FOR REDUCING THE INDUCED SPEEDS IN VORTICES IN THE WAKE OF AN AIRCRAFT

(75) Inventor: Jerome Journade, Toulouse (FR)

(73) Assignee: Airbus Operations SAS, Toulouse (FR)

( * ) Notice: Subject to any disclaimer, the term of this patent is extended or adjusted under 35 U.S.C. 154(b) by 16 days.

(21) Appl. No.: 12/738,214

(22) PCT Filed: Oct. 16, 2008

(86) PCT No.: PCT/FR2008/051869
§ 371 (c)(1),
(2), (4) Date: Aug. 13, 2010

(87) PCT Pub. No.: WO2009/053649
PCT Pub. Date: Apr. 30, 2009

(65) Prior Publication Data
US 2010/0294890 A1 Nov. 25, 2010

(30) Foreign Application Priority Data
Oct. 16, 2007 (FR) .................................... 07 58344

(51) Int. Cl.
*B64C 13/00* (2006.01)
*B64C 13/16* (2006.01)
(52) U.S. Cl. ..................................... 244/183; 244/199.2
(58) Field of Classification Search ............... 244/199.1, 244/199.2, 199.3, 183, 186, 187, 188, 194, 244/195; 701/10, 16, 18
See application file for complete search history.

(56) References Cited

U.S. PATENT DOCUMENTS

| 6,082,679 A  * | 7/2000 | Crouch et al. ............. 244/199.3 |
| 6,513,761 B2 * | 2/2003 | Huenecke ................. 244/199.1 |
| 6,719,246 B2  | 4/2004 | Corjon et al. |
| 7,874,523 B2 * | 1/2011 | Laporte et al. ............. 244/199.1 |

FOREIGN PATENT DOCUMENTS

| EP | 1145954 A | 10/2001 |
| EP | 1746024 A | 1/2007 |
| FR | 2821605 A | 9/2002 |

OTHER PUBLICATIONS

Norris, G., "Boeing seeks NASA input as it unveils anti-vortex system," Flight International, vol. 157, No. 4714, p. 9. Feb. 8-14, 2000.*
International Search Report dated Mar. 19, 2009.

* cited by examiner

*Primary Examiner* — Tien Dinh
*Assistant Examiner* — Richard R Green
(74) *Attorney, Agent, or Firm* — Perman & Green, LLP

(57) ABSTRACT

A method and a device for creating a continuous protected space along the path of an aircraft, in which protected space a maximum induced speed Vtc in a vortex of radius Rtc in the wake of an aircraft is decreased by increasing the radius Rtc. The method includes a preliminary step of identifying changes in the aerodynamic configurations of the aircraft liable to initiate disruptions in the wake that will have the effect of increasing the radius Rtc, —for each change in configuration determining beforehand the characteristics of propagation of the wake disturbances in the vortex, —carrying out, along the course of the aircraft, at least two configuration changes separated by a distance such that spaces, in which the effects of the wake disturbances resulting from each of the configuration changes propagated for a predetermined length of time, forms a substantially continuous protected space.

9 Claims, 4 Drawing Sheets

METHOD AND DEVICE FOR REDUCING THE INDUCED SPEEDS IN VORTICES IN THE WAKE OF AN AIRCRAFT

CROSS-REFERENCE TO RELATED APPLICATIONS

This application is the National Stage of International Application No. PCT/FR2008/051869 International Filing Date, 16 Oct. 2008, which designated the United States of America, and which International Application was published under PCT Article 21 (s) as WO Publication No. WO2009/053649 A1 and which claims priority from, and the benefit of, French Application No. 200758344 filed on 16 Oct. 2007, the disclosures of which are incorporated herein by reference in their entireties.

BACKGROUND

The aspects of the disclosed embodiments belong to the field of aircraft flight control. More specifically, the disclosed embodiments find application during airplanes' final phases of flight, phases during which an airplane on approach to a runway is normally likely to be followed at a relatively short distance by another airplane on approach.

An airplane wing in relative movement with respect to the air generates vortices, and generally the greater the lift generated by the wing the more intense the vortex.

In practice, vortices are generated by any aerodynamic aerofoil of a finite span and an airplane wing is the source of various vortices, generally in pairs, with a vortex on a side of the wing having a symmetry with respect to a plane of symmetry of the airplane.

This phenomenon, illustrated schematically in FIG. 1 by the representations of the windings of vortex sheets attached to the wing tips, is well known and for various reasons it is beneficial to reduce the intensity of the vortices 3 of a wing 2 of an airplane 1, which is achieved, for example, by adapting the shape of the wing.

One of the reasons for which airplane manufacturers seek to reduce the intensity of the vortices generated by airplanes' wings is linked to the danger that a vortex can represent for an airplane whose path crosses a vortex caused by the passage of another airplane.

The danger in question depends upon the intensity of the vortex relative to the mass of the airplane whose path crosses the vortex. From a simple reduction in the handling comfort and the passengers' comfort when the relative intensity is low, the airplane can experience difficulties maintaining its path, or even deviate from its nominal path, when the vortex is of a moderate or high intensity, for example with disconnections of the automatic pilot, and in extreme cases the level of turbulences generated by the vortex can endanger the airplane's physical integrity.

One method, applied by all the organizations in charge of managing the circulation of airplanes in flight, consists of organizing airplanes' paths in space and time so as to maintain a sufficient distance, known as the separation distance Ds, between a following airplane located approximately on the same path as an airplane preceding it.

As a result of this separation distance, a minimum time passes before there is a risk of the following airplane penetrating the preceding airplane's vortex.

During this minimum time the vortex generated by the preceding airplane's passage has moved, displaced laterally or horizontally with respect to the path, and the speeds induced in the vortex have lessened because of the interaction of said vortex with the atmosphere so as to no longer present a risk for the following airplane.

In particular, these minimum times apply to airplanes during the approach phases, phases during which around airports the concentration of airplanes in the airspace and the necessary convergence of paths towards the landing strips are such that the issue of airplane separation is a critical problem.

The International Civil Aviation Organization (ICAO) defines the minimum separation distances that must be applied by air traffic control.

These separation distances are a function of the respective masses of the airplanes concerned. The heavier the preceding airplane and the lighter the following airplane then the greater the minimum separation distance must be, due to the greater intensity of the vortices generated by the heavy airplanes and the lighter airplanes' greater sensitivity to vortices.

For example, for what is known as an average following airplane, with a mass of between 7 and 136 tonnes, the separation distance defined by the ICAO is 3 nautical miles if the preceding airplane is a light airplane, with a mass of less than 7 tonnes, or another average airplane, and this separation distance is increased to 5 nautical miles if the preceding airplane is a heavy airplane with a mass greater than 136 tonnes.

When a light airplane follows a heavy airplane, the separation distance is increased to 6 nautical miles.

These, necessary, minimum separation distances are constraints for air traffic management and constitute a limit to the increase in an airport's capacity.

To reduce the minimum separation distances, or to not be forced to increase them in certain cases, one method consists of accelerating the natural destruction of the vortex generated by an airplane.

Patent FR 2821605, also published as U.S. Pat. No. 6,719,246, describes a device fixed on an airplane's wing that generates a periodic disruption in the flow, which perturbation provokes at least one mode of instability for the vortex that has the effect of accelerating its natural destruction.

This device thus makes it possible to reduce the minimum separation distance between two airplanes on close paths, however it requires fitting specific means on each airplane that need be determined for each model of airplane and which can pose particular installation difficulties, even more so as it is important that the specific means do not generate significant drag during the airplane's cruising phases.

Thus, while such a system can be introduced with constraints when designing a new airplane, it is more difficult to define for existing models of airplanes and requires the application of substantial modifications for airplanes in operation that were not equipped with the device to begin with.

SUMMARY

Without the need for substantial modification to airplanes, the method according to the disclosed embodiments creates a continuous protected space along an airplane's path.

In the protected space, a maximum speed Vtc induced in a vortex of radius Rtc of an airplane wake is reduced through increasing the radius Rtc, by applying the method, which comprises:
- a prior step of identifying changes in the airplane's aerodynamic configurations likely to trigger wake disturbances having the effect of increasing the radius Rtc;
- for each configuration change likely to trigger a wake disturbance, the prior determination of propagation characteristics of the wake disturbances in sections of the vortex close to a section of the vortex where said configuration change had been carried out;

the carrying out along the airplane's path of at least two configuration changes separated on said path by a distance such that spaces, in which the effects of the wake disturbances resulting from each of said at least two configuration changes are propagated during a pre-defined length of time, are separated by a distance of almost zero or overlap so as to create a continuous protected space.

Preferably, for determining the dimensions of the protected space, the wake disturbance propagation characteristics used comprise:

a length of time $\Delta$Tps corresponding to the time required so that the radius Rtc of the vortex increases by a pre-defined value $\Delta$Rt % in a section of the vortex under the effect of the wake disturbance after said wake disturbance has reached said section of the vortex;

a propagation speed Vpp-upstream of the wake disturbance along the vortex in one direction, called the upstream direction, opposite to the direction of the airplane's movement along its path;

a propagation speed Vpp-downstream of the wake disturbance along the vortex in one direction, called the downstream direction, corresponding to the direction of the airplane's movement along its path;

In order to optimize the protected space, preferably the distance separating a point of a configuration change, called the first configuration change, from a point of a configuration change, called the second configuration change, following the first configuration change along the airplane's path, is a function of a separation distance Ds between the airplane and a following airplane located upstream on approximately the same path as the airplane and a speed Vav of the following airplane.

The speed Vav of the following airplane is for example a measured value or an estimated value or even an arbitrary value greater than the speed of the following airplane when this speed is not known.

In order to obtain the greatest possible dimension of the protected space, the distance separating the first and the second configuration changes is less than or approximately equal to the sum of a distance Ddownstream downstream of the point of the first configuration change and a distance Dupstream upstream of the point of the second configuration change along the airplane's path with:

Ddownstream=(Ds−$\Delta$Tps×Vav)×Vpp-downstream/(Vav−Vpp-downstream), with the values of $\Delta$Tps and Vpp-downstream chosen from the propagation characteristics of the wake disturbance associated with the first configuration change;

Dupstream=(Ds−$\Delta$Tps×Vav)×Vpp-upstream/(Vav+Vpp-upstream), with the values of $\Delta$Tps and Vpp-upstream chosen from the propagation characteristics of the wake disturbance associated with the second configuration change.

To limit the consequences on the design of an airplane and to easily apply the method with an airplane that has already been defined, for example an existing airplane, the configuration changes are advantageously realized by changes of position of mobile surfaces of the airplane, for example trailing-edge flaps and or leading-edge slats and or lift dampers and or ailerons, and or by a change in the airplane's attitude during a landing.

Taking airplanes' low altitude flight phases into account, the method is used to create a protected space during terminal approach phases and the configuration changes are realized along a path corresponding to an approach phase of the airplane ending in a landing at a point Att such that the continuous protected space extends from a point of the approach path away from the Att through to at least point Att.

When the necessary characteristics of a following airplane are not known with the required degree of certainty, the method is advantageously utilized to create a minimum protected space by considering a {speed Vav–distance Ds} pair chosen from {speed–distance} pairs associated to different models of following airplanes envisaged, to determine the distances between the configuration changes so as to produce a protected space compatible with any one whatsoever of said different models of following airplanes envisaged.

The disclosed embodiments also concern a device for creating a continuous protected space along an airplane's path in which protected space a maximum speed Vtc induced in a vortex of radius Rtc of an airplane wake is reduced through increasing the radius Rtc.

The device determines moments at which at least two successive aerodynamic configuration changes of the airplane must be carried out to create the continuous protected space and comprises:

at least one memory in which are stored information representative of wake disturbance propagation characteristics and information about the airplane and its environment;

means of calculation for generating instructions for successive changes of aerodynamic configurations (5-6), (6-7), (7-8) of the airplane (1) such that wake disturbances having the effect of increasing the radius Rtc caused by said configuration changes are propagated in the vortex and create the continuous protected space after a pre-defined time taking into account information stored in the memory.

Advantageously the device comprises means of generating instruction signals for changing the airplane's configuration which are submitted to a member of the airplane's flight crew who is able to carry out the necessary configuration changes or to control the proper execution of configuration changes and or which are sent to control systems acting on the changes to the airplane's configurations in order to carry out the configuration changes at the required times.

To avoid a following airplane entering a vortex comprising speeds greater than the speeds expected in cases where the conditions for creating the protected space were not met, the device comprises for preference means of generating an alarm signal when the configuration changes carried out do not conform to the configuration changes likely to create a continuous protected space.

For an effective application of the method, the disclosed embodiments also concern a device helping the management of airplane traffic during approach phase in which a separation distance Ds between a following plane and an airplane preceding it on an approach path is established as a function of the preceding airplane's capabilities for creating a protected space by applying the method of the disclosed embodiments.

BRIEF DESCRIPTION OF THE DRAWINGS

The detailed description of an example of the implementation and realization of the disclosed embodiments is made with reference to the figures, which represent.

DETAILED DESCRIPTION

The purpose of the disclosed embodiments is a method and a device that reduce, in a limited volume of space along an airplane's path, for example an approach path to a runway, the speeds induced in vortices generated by the airplane.

The detailed description of the method according to the disclosed embodiments is made in the particular case of an approach with a view to a landing on a runway, but the disclosed embodiments can also be applied in any flight phase of an airplane.

The disclosed embodiments are based on the use of a particular physical phenomenon that is referred to in the rest of the description by the expression "wake disturbance".

The wing lift is a generator of vortices 3, at least one at each extremity 21 of the wing 2 span, resulting from differences of pressure between a lower surface, the intrados, and an upper surface, the extrados, of the wing 2 at its extremities 21 of the wing span, necessarily a finite span on an airplane.

In order to simplify the illustrations, only the vortices 3 of the extremity of the wing 2 are illustrated, it being well known furthermore that numerous vortices other than those of the wing tips are likely to come into being on a wing, especially at the extremities of mobile surfaces of the wing and that in certain cases, especially in the case of high-lift slats, these vortices can be more intense than those at the wing tips.

The description of the disclosed embodiments also applies to these different vortices.

The wake disturbance phenomenon exploited by the disclosed embodiments comes into being when an airplane wing sees a lift distribution spanwise change rapidly, in general to approximately constant total lift during a flight phase.

The wake disturbance destroys the vortices by modifying their intensities only a little or not at all rather by significantly reducing their induced speeds through increasing characteristic radii of the vortices.

This phenomenon is known per se to aerodynamic specialists but it is experienced today as a detrimental phenomenon that disturbs the measurements taken in aerodynamics and deteriorates the accuracy of the measurements.

To analyze the wake disturbance phenomenon and its effects in more detail, a single vortex is considered to begin with, the phenomenon being applicable to all the vortices generated by an airplane wing.

Figure 1:
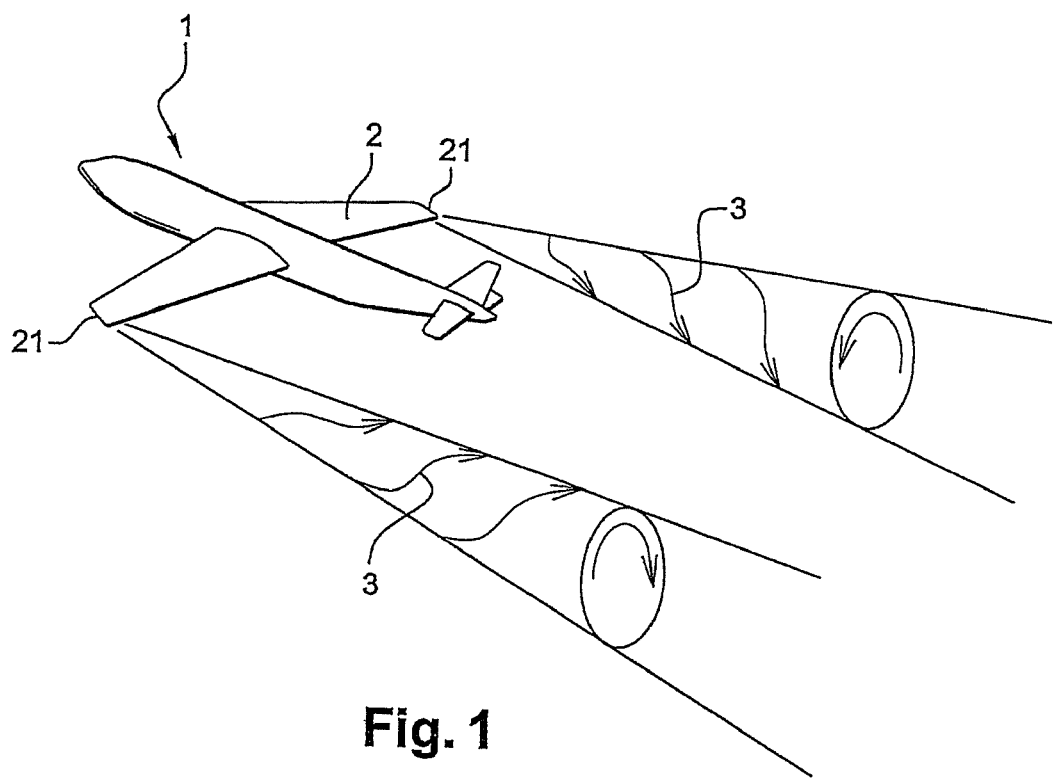
FIG. 1: already mentioned, a simplified illustration of the formation of vortices at the tips of an airplane wing.

As diagrammed in FIG. 1, a vortex 3 comes into being in the air mass in which airplane 1 maneuvers at a specific point of the wing 2. As the wing 2 of the airplane 1 moves with respect to the air, airplane 1 leaves behind it in the air mass a vortex 3 which develops approximately along a path followed by airplane 1.

In practice, the vortex diverges vertically from the path because of a descending speed due to a dynamic induced by the vortex and or in other variable directions according to disruptive atmospheric factors for example such as winds or temperature gradients.

Figure 3:
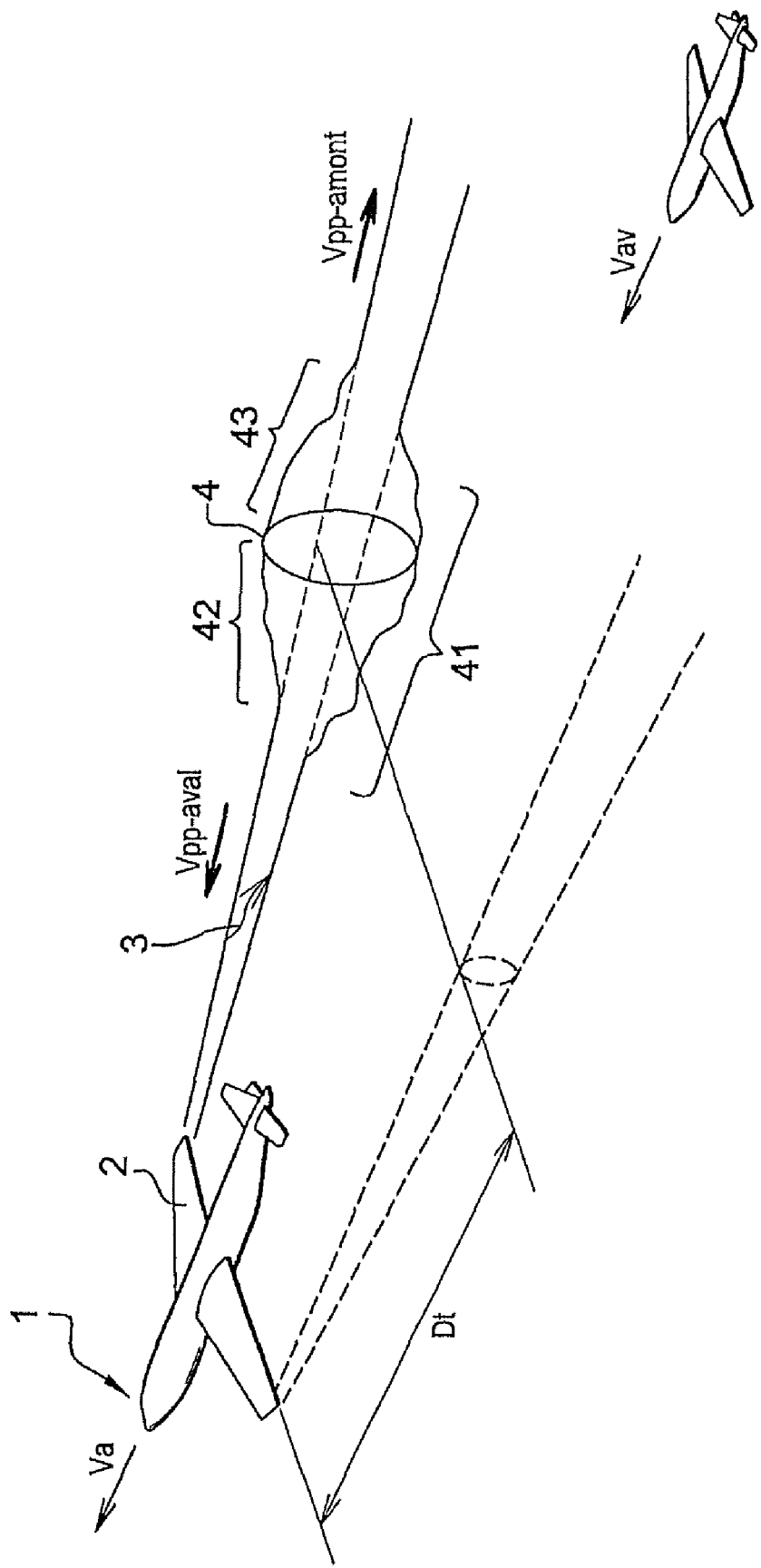
FIG. 3: a schematic illustration of the wake disturbance phenomenon and its propagation along the vortex.

The airplane 1 moving in the air with a speed Va, the time Tt, for a section considered of the vortex 3, elapsed since the passage of the airplane 1 is equivalent to a distance Dt at which the airplane is located with respect to said section as a result of the relationship Dt=Va×Tt. As illustrated in FIG. 3, the wake disturbance generated at a given instant in the section 4 of the path develops firstly according to its radius and secondly propagates its effects on the radius of vortex 3 in an area 41 along said vortex, i.e. the wake disturbance progressively affects sections of the vortex in areas 42 located on the side of the airplane 1 with respect to the section 4 initially disturbed and sections of the vortex in areas 43 located on the opposite side of the airplane 1 with respect to the section 4 initially disturbed.

Thus, while at the time of the lift distribution modification the wake disturbance has its effects limited in a section 4 of vortex 3, in practice over a small length of the vortex along the path followed by airplane 1, after a certain time, whereas the airplane has moved on its path away from the place where the wake disturbance was generated, the area 41 along the path of the vortex 3 affected by the wake disturbance is increased and continues to increase as time passes and airplane 1 therefore continues on its path.

This phenomenon is referred to here under the term wake disturbance propagation.

The wake disturbance propagation moves with a speed Vpp-downstream in the direction of the movement of airplane 1 on its path and with a speed Vpp-upstream in the opposite direction along the path.

Speeds Vpp-downstream and Vpp-upstream are not constants in absolute values.

However, in the case of a heavy civil airplane, with a mass greater than 136 tonnes, in standard approach conditions, these propagation speeds are of the same order of magnitude and estimated around ten meters per second, values that can advantageously be verified experimentally, numerically or theoretically for each specific case, i.e. for each airplane model, for each means of generating a wake disturbance and for each atmospheric condition for which the means of generating a disturbance is utilized.

It will be noted that these speeds are of a different order of magnitude to the flight speeds of conventional commercial airplanes on approach paths which, for the airplanes considered, are on average 70 m/s.

This phenomenon being well understood from its effects, it should be noted that the aerodynamic configuration changes of an airplane wing are generally sources of modifications to the lift distribution on the wing.

Such well-known configuration changes correspond, for example, to movements, extension or retraction, of the wing's high-lift devices, basically trailing-edge flaps on the one hand and leading-edge slats on the other hand.

All modern transport aircraft are equipped with such devices, at least high-lift slats, which are deployed during approach phases to reduce the landing speeds.

Other devices also found on numerous airplanes modify the lift distribution on a wing when they are used, for example spoilers used in airbrake functions or lift dampers.

Generally, every mobile surface of an airplane, especially the ailerons, used for controlling the airplane in rolls, also modifies the lift distribution on the wing when used.

Figure 2A:
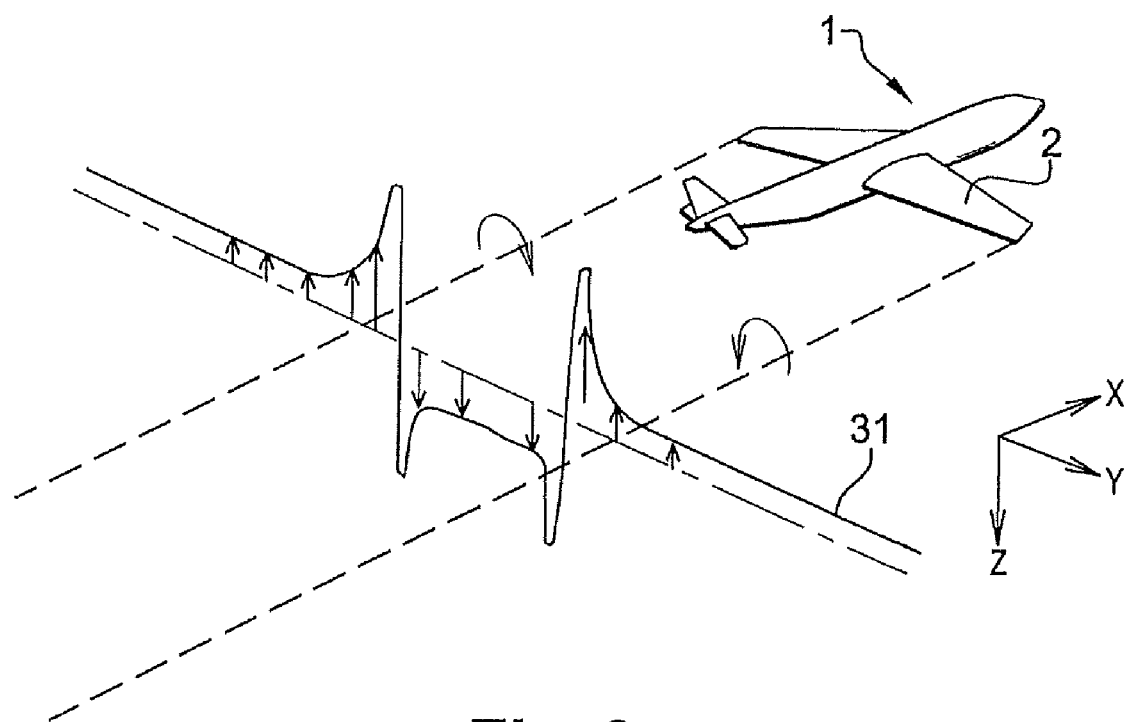
FIG. 2*a*: a schematic illustration of the speed fields induced behind an airplane.
Figure 2B:
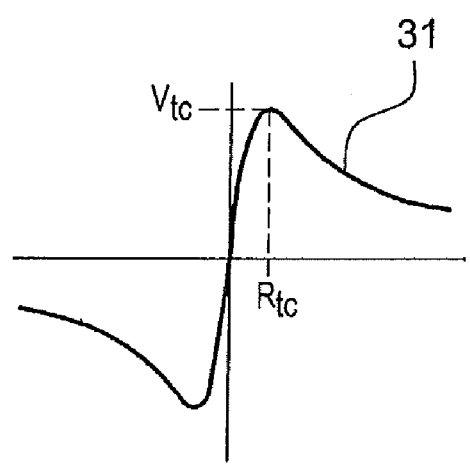
FIG. 2b: a simplified illustration of the speed fields in a specific vortex.

In accordance with the disclosed embodiments, during a flight phase of airplane 1 during which it is wished to reduce the speeds induced in vortices, a speed field 31 of which is illustrated in FIG. 2a, generated in a given volume of space behind said airplane, wake disturbances are generated, by means of the airplane 1, at specific moments of the flight so that said wake disturbances are going to increase a radius Rtc of the vortices 3 generated by the airplane's wing 2 such that the speeds induced in the vortices 3, in particular a maximum speed Vtc corresponding to the definition of the radius Rtc of the vortex as illustrated in FIG. 2b, are reduced by a given value for a airplane 10 following at a certain distance, with respect to a case not implementing the disclosed embodiments, or that the minimum distance with a following airplane 10 can be reduced without the speeds induced in the vortex 3 that may be encountered by said following airplane being increased, with respect to a case not implementing the disclosed embodiments.

The wake disturbances are generated, for the approach phases during which the problem is critical for the following airplanes 10, advantageously with existing means of airplane 1, by determining a number and moments of approach configuration changes, i.e. basically changes in the positions of slats and flaps, so as to maximize a continuous volume of the space in which the wake disturbances are propagated and in which said volume the radius Rtc is increased by at least a pre-defined value because of the wake disturbance.

An application example of the method is described in a particular case and with numerical values and assumptions that are simplified, yet nevertheless representative of an actual case for civil aircraft.

This numerical application example is not limiting and the person in the field is able to apply the method described to each particular case, if necessary by carrying out the experimental, numerical or theoretical verifications to determine the parameter values to be taken into account so as to ensure an adapted implementation of the method.

Figure 4A:
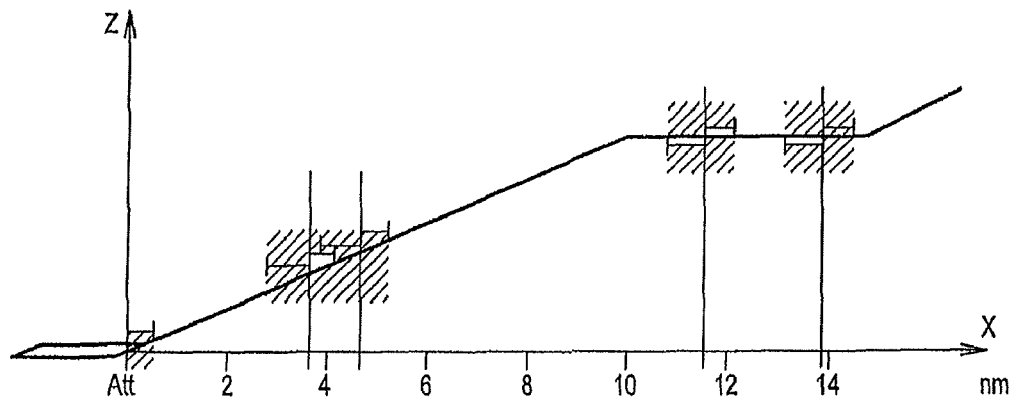
FIG. 4a: an illustration of an approach path comprising configuration changes using a typical conventional method.
Figure 4B:
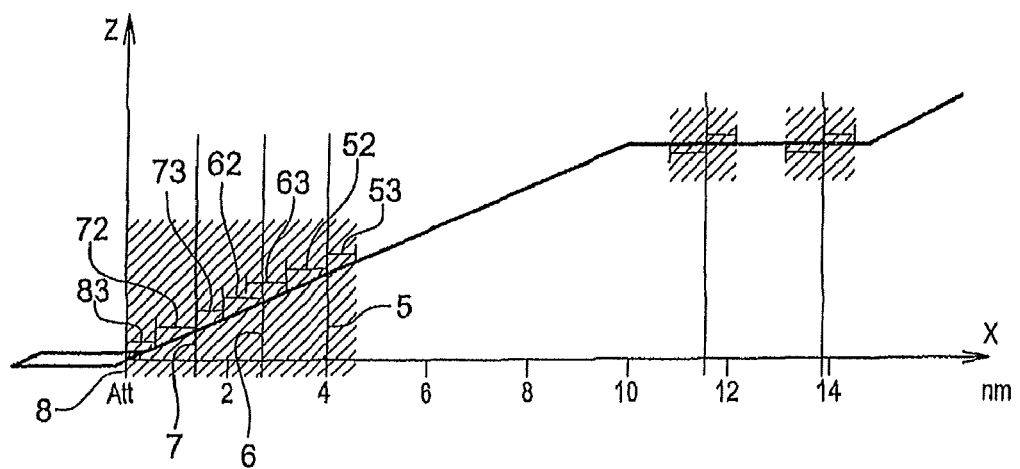
FIG. 4b: an illustration of an approach path comprising configuration changes using a method according to the disclosed embodiments.

FIGS. 4a and 4b schematically illustrate a standard approach path of a civil airplane on a runway. The path is represented in a plane defined by a horizontal axis X representing the distance up to a landing point Att following a curvilinear path of the airplane and by an axis Z representing the height above the landing point Att.

Following usages in the field of airplane flight control, the distances along the horizontal axis X are expressed in nautical miles (nm).

In the case studied, in a flight space of a following airplane 10 it is sought to obtain a vortex such that the radius Rtc of said vortex is increased at least by a value $\Delta Rt\%$, for example 50%, as a result of the wake disturbance with respect to the radius that said vortex would have in the same section at the same moment in the absence of the wake disturbance.

A space responding to this criterion is designated in the rest of the description by the expression "protected space".

A value of 50% for $\Delta Rt\%$ corresponds approximately to a 100 m2/s reduction of the circulation of the vortex in the case of a vortex of 800 m2/s.

The $\Delta Rt\%$ increase of the radius is obtained after a time $\Delta Tps$, for example about 15 seconds for $\Delta rt\%=50\%$ in the example used, after the arrival of the wake disturbance in a section considered of the vortex.

At flight speed Vav of the following airplane 10, the airplane travels a distance Ds, corresponding to the regulatory separation distance between airplanes of the heavy category, in a time known as separation time Ts equal to Ds/Vav.

The time Ts represents the age of the vortex in which the following airplane 10 is likely to penetrate.

When a configuration change of the preceding airplane 1 having caused a wake disturbance is produced for at least a time equal to Ts−$\Delta Tps$, the space in which the vortex 3 is affected by the propagation of the wake disturbance at the end of a length of time Ts experiences the effects of said wake disturbance during at least the length of time $\Delta Tps$ and corresponds to a protected space 41.

In every point of said space 41 a radius Rtc of vortex 2 is developed during at least length of time $\Delta Tps$ and therefore said radius Rtc of said vortex in the area having experienced the influence of the wake disturbance is increased by at least $\Delta Rt\%$.

During the length of time $\Delta Tps$ necessary to ensure the growth of the radius of the vortex 3 in all the sections of the protected space 41, the following airplane 10 will have traveled a distance of $\Delta Tps \times Vav$.

The following airplane 10 moving at speed Vav along the path and the wake disturbance being propagated in the direction of the following airplane 10 at speed Vpp-upstream, said following airplane penetrates, possibly, into the protected space 41 at the earliest after a time Tupstream following the configuration change corresponding to the time to travel the distance Ds−$\Delta Tps \times Vav$ at rate of closure Vav+Vpp-upstream, the sum of the speed of the following airplane 10 and the speed of the wake disturbance propagation in the direction of said following airplane (the speeds are considered here as modulus).

At said time Tupstream, the wake disturbance is propagated upstream, at speed Vapp-upstream, along the path followed by the preceding airplane 1 and the volume 43 of the protected space 41 on the side of the positive×values along the path of the airplane 1 with respect to the configuration change point, over a distance Dupstream equal to Tupstream×Vpp-upstream.

A following airplane 10 moving at speed Vav will therefore have an upstream protected space 43, upstream of section 4 corresponding to a configuration change point of a preceding airplane 1, which extends to a distance Dupstream:

$$\text{Dupstream}=(Ds-\Delta Tps\times Vav)\times Vpp\text{-upstream}/(Vav+Vpp\text{-upstream})$$

Expression in which the terms have the meanings defined previously.

Downstream of section 4 of the configuration change of the preceding airplane 1, the wake disturbance is propagated at speed Vpp-downstream, along the direction of movement of preceding airplane 1, which is also the direction of movement of the following airplane 10. The following airplane 10 is therefore going to catch up with the area of the wake of the preceding airplane 1 that no longer belongs to a downstream protected space 41 with a relative speed Vav reduced by the speed Vpp-downstream of the wake disturbance propagation downstream.

The following airplane 10, following a similar logic to the previous case, reaches the limit of the downstream protected space 42 downstream of the section 4 corresponding to the configuration change point at a distance Ddownstream:

$$\text{Ddownstream}=(Ds-\Delta Tps\times Vav)\times Vpp\text{-downstream}/(Vav-Vpp\text{-downstream})$$

Expression in which the terms have the meanings defined previously and in which the speeds are considered as modulus.

The application of the above formulae means an order of magnitude can be given to the dimensions of the protected space in a realistic practical case.

Taking $\Delta Rt\%=50\%$ for $\Delta Tps=15$ s.

With Vav=70 m/s, Ds=4 nm (separation between airplanes in the heavy category)

and with Vpp-upstream=Vpp-downstream=14 m/s, the following are obtained:

Dupstream=1060 m=0.57 nm

Ddownstream=1590 m=0.86 nm i.e. a protected space that extends in total over 2650 m or 1.43 nm When the preceding airplane 1 performs two successive configuration changes, a first change 5, 6, 7 between a configuration n−1 and a configuration n then a second change, 6, 7, 8, respectively between configuration n and a configuration n+1, according to the disclosed embodiments the two said configuration changes are performed such that the sum of the length Ddownstream(n) along X of the protected space 52, 62, 72 downstream associated to the first configuration change and the length Dupstream(n+1) along X of the protected space, 63, 73, 83 respectively upstream associated to the second configuration change are at most equal to the distance traveled by preceding airplane 1 between the two configuration changes 5 and 6, 6 and 7, 7 and 8.

When several configuration changes 5, 6, 7, 8 are carried out such that each change is carried out with respect to the preceding configuration change, according to the criteria that have just been described, the protected space associated to said successive configuration changes does not present any discontinuity along the path and extends from upstream, at distance Dupstream(n), of the first configuration change located upstream of the path followed by airplane 1, through to distance Ddownstream(n+1), of a last configuration change located downstream on said path.

In practice, according to the preceding numerical example and assuming they are unchanged, the characteristic values of the propagation conditions associated to the configuration changes have obtained a protected space of 5300 m or 2.86 nm with two configuration changes.

In FIG. 4b, three configuration changes 5, 6, 7 are carried out before a landing 8 and in this case, always with the same assumptions as the numerical example, the protected space up to landing at Att is raised to 9010 m or 4.86 nm, corresponding to the sum of the protected spaces obtained downstream 52, 62, 72 and upstream 53, 63, 73, 83 for each configuration change, the downstream distance linked to the landing 8 not being considered here.

Thus, in the areas in which the vortices of a preceding airplane 1 are the most dangerous for a following airplane 10, i.e. the areas close to the ground, in particular on approach to a runway, the method according to the disclosed embodiments consists of carrying out configuration changes 5, 6, 7, 8 for preceding airplane 1, each of which has the effect of triggering a wake disturbance of said preceding airplane 1, at moments or distances between changes such that a chosen volume along the path of said preceding airplane 1 is affected fully, according to a given criterion, by the wake disturbance at the moment when the following airplane 10 is likely to penetrate the wake of preceding airplane 1 taking the separation distance Ds into account.

For a landing phase as illustrated in FIG. 4b, in which the application of the method turns out to be especially beneficial, the portion of the path affected by the wake disturbance, segment of the path corresponding to the hatched length in FIG. 4b, is chosen to be extended preferably to the ground and go back along the path for the greatest possible distance from the landing point Att.

The situation obtained by applying the method of the disclosed embodiments, the example of which is presented in FIG. 4b, is advantageously compared to the situation in FIG. 4a, which illustrates an airplane's conventional approach, a conventional approach that experiences but ignores the wake disturbance phenomenon and does not use said phenomenon to create a defined protected space.

In this conventional approach, two configuration changes of the airplane are performed in the terminal approach phase, during the 6 nm before the landing, approximately 4.5 nm and 3.5 nm from the landing point Att.

In this case a significant area of the path, from about 3 nm up to 0.5 nm from point Att, does not correspond to a protected space as defined by the disclosed embodiments and it is not possible to consider that, for the following airplane, the speeds induced in the vortices that may be encountered are reduced.

Moreover, the areas created by the two configuration changes, subjected to wake disturbances, overlap excessively without any particular care, in a random way, which does not make it possible to benefit from an optimized protected space.

It must therefore be noted that during the landing at point Att, the rapid change in the attitude of airplane 1 itself generates a variation on the lift distribution comparable to a configuration change 53. The landing therefore induces a wake disturbance that propagates its effects, extending upstream of the path in particular.

Advantageously, the configuration changes are carried out by changes in the positions of slats and flaps in successive steps from a configuration in which the slats and flaps are completely retracted, known as a clean configuration, or from an initial configuration in which said slats and flaps are partially extended, to a landing configuration in which the slats and flaps are fully extended.

Most airplanes have intermediary positions of the slats and flaps between the clean and landing positions that can be used as means of configuration change for the disclosed embodiments.

In addition, in the context of the application of the disclosed embodiments it is easy to define a larger number of intermediary configurations in order to optimize the volume of the space affected by the vortex disturbance effect while remaining within the operational constraints of the airplane landing and provided that the modification of the lift distribution induced creates a sufficient wake disturbance with regard to the effect sought.

For example, for the approach illustrated in FIG. 4b an intermediary aerodynamic configuration has been created with respect to the case of the approach illustrated in FIG. 4a, so as to increase the dimensions of the protected space.

In order to carry out said lift distribution modifications necessary, it is also possible to use other means of the airplane than the slats and flaps, for example use the lift dampers or spoilers or use the ailerons.

In this latter case advantageously the spoilers are utilized in an approach flight phase sufficiently upstream to limit their use near the ground and, unlike their most widespread use, by significantly modulated actions rather than by seeking a not very mobile average position that may not generate much wake disturbance.

The example that has just been detailed must be applied by taking each specific situation into account and in particular:
- airplanes' speeds over the paths;
- separation distances considered;
- wake disturbance propagation speeds, and in particular atmospheric conditions, pressure, temperature, wind, etc, that affect said propagation speeds and are generally known during a flight;
- . . . .

The implementation of the method pre-supposes that the vortex signatures for the airplane 1 considered have already been determined for each of its different usable configurations and the propagation speeds Vpp-upstream and Vpp-downstream of the upstream and downstream wake disturbance effects for each configuration change, which speeds may be more or less different for an airplane considered unlike the numerical example used.

These values are advantageously established experimentally and or by means of numerical simulations and or theoretical approaches.

The determination of the protected space depends on the speed Vav of the following airplane 10 and the separation distance Ds.

If these parameters, which are not dependent upon the preceding airplane 1 which must apply the method in order to maximize the protected space, are not known for said preceding airplane 1, advantageously this latter applies a method compatible with all types of potential following airplanes 10 by considering a speed Vav of the following airplane corresponding to the maximum speed that may effectively be considered for a following airplane on approach and a separation distance Ds corresponding to the minimum possible separation distance for the following airplane.

It should be noted that the method makes it possible to reduce the speeds induced in the vortices generated by the wing of an airplane, in a given volume along the path, case of the example described in detail but that, in a special mode of implementing the method, the separation distances between the airplanes in approach and landing phases are reduced preserving the level of the accepted speeds induced in the vortex without the implementation of the disclosed embodiments.

For implementing the method a device according to the disclosed embodiments comprises advantageously an equipment, for example an equipment onboard airplane 1, which equipment receives, from other equipment of airplane 1 and or the following airplane 10 and or ground facilities, the required information about the airplane, in particular information needed to establish its position with respect to the landing runway and its speed, and the required information about the airplane's environment, in particular information needed to establish the values of the influential atmospheric parameters and the following airplane's distance and speed.

According to these parameters and stored constants, in particular the propagation characteristics of wake disturbances in different conditions, the equipment determines the sequence of configuration changes by applying the described method.

Advantageously, the values of parameters whose exact value is difficult to know, in the state of the systems currently in operation, are set to default values or evaluated at values approximated based on parameters whose values are easily accessible.

In cases where approximated values are used, said values used are chosen to ensure that the wake disturbances are effectively propagated in the wished-for volume of protected space.

For example, the approach speeds of airplanes in flight phases of the terminal zones of airports being relatively similar for the different civil transport aircraft, it is advantageous to choose a constant speed Vav for calculating distances Dupstream and Ddownstream that minimize (as a precaution) said distances, i.e. a speed Vav corresponding to the maximum speeds to be taken into consideration in the airspace considered.

In another example, envelope values of Dupstream and Ddownstream are established initially, from which minimum values of Dupstream and Ddownstream are chosen for managing approach paths and aerodynamic configuration changes.

In a form of embodiment the device sends orders to the mobile surfaces of the wings, for example to the slat and flap control systems, where appropriate to the spoiler control system and or the aileron control system, to undertake the configuration change actions wanted.

In a particular form of embodiment the device is incorporated into an optimized flight path management system for the airplane, a criterion of optimizing the protected space thus being taken into account by said flight path management system.

In another form of embodiment the device generates signals destined for the flight crew, for example sound and or visual messages, to indicate the different configurations to be selected at each moment when a configuration change must be carried out.

Advantageously, the device monitors that the different configurations wanted have been properly applied, automatically or manually, and information messages about the execution of the sequence of configuration changes are sent for example to air traffic control services or to the following airplane, where said information messages may take the form of alarm messages if the wished-for sequence for reducing the intensity of wake vortices has not been fully complied with and in that case there is a possibility of the following airplane penetrating into a wake with vortices more intense than those anticipated if no corrective action is implemented.

In a particular form of embodiment of the device, all or part of the device according to the disclosed embodiments is integrated into one or more existing equipment in the plane, for example a flight management computer system.

Applied to specific situations the disclosed embodiments make it possible to not increase separation distances, or to limit their increase, for particular combinations of preceding airplanes and following airplanes that would, without the disclosed embodiments, require these distances to be increased, and makes it possible, where appropriate, to reduce the minimum spacing required without the disclosed embodiments between a following airplane and a preceding airplane.

Thus the disclosed embodiments concern a device advantageously integrated into means such as those used by air control centers for managing airplane traffic in approach phase.

In such a device, a separation distance Ds between a following airplane 10 and an airplane 1 preceding it on an approach path is determined differently according to whether the preceding airplane 1 does or does not apply an approach method allowing the generation of a protected space as defined by the disclosed embodiments.

The disclosed embodiments therefore make it possible to reduce for a following airplane the risk incurred due to the existence of a vortex generated by the passage of a preceding airplane especially during a terminal approach phase to a runway or, without creating a specific risk, to reduce the spacing between the following airplane and the preceding airplane.

The invention claimed is:

1. A method for creating a continuous protected space along a path of an airplane, in which said protected space a maximum speed Vtc induced in a vortex of radius Rtc of a wake of airplane is reduced through increasing the radius Rtc of the vortex, said method comprising:

a prior step of identifying two or more changes of aerodynamic configurations for the airplane to trigger wake disturbances having the effect of increasing the radius Rtc of the vortex by a predefined value as a result of the wake disturbance in a given time;

for each identified configuration for triggering such a wake disturbance, determining propagation characteristics along the vortex in an upstream direction, opposite to a direction of movement of the airplane along the airplane path, and in a downstream direction, corresponding to a direction of movement of the airplane along the airplane path, of the wake disturbances in sections of the vortex proximate a section of the vortex where said configuration change had been carried out;

carrying out at least two of the aerodynamic configuration changes along the path of the airplane separated by a distance such that spaces, in which effects of the wake disturbances resulting from each of said at least two configuration changes are propagated along the vortex during a predefined length of time, are separated by a distance along the airplane path of almost zero or overlap along the airplane path so as to create a continuous protected space along the airplane path in which the maximum speed Vtc of the vortex is reduced because of the wake disturbance by at least a predefined value.

2. A method according to claim 1 in which the propagation characteristics of a wake disturbance comprise:

a length of time ΔTps corresponding to the time required so that the radius Rtc of the vortex increases by a predefined value ΔRt % in a section of the vortex under the effect of the wake disturbance after said wake disturbance has reached a section of the vortex;

a propagation speed Vpp-upstream of the wake disturbance along the vortex in the upstream direction;

a propagation speed Vpp-downstream of the wake disturbance along the vortex in the downstream direction.

3. A method according to claim 2 in which the distance separating a point of a first configuration change from a point of a second configuration change, following the first configuration change along the flight path of airplane, is a function of a separation distance Ds between the airplane and a following airplane located upstream on approximately the same path as the airplane and a speed Vav of the following airplane, said value Vav being a measured value of the following airplane's speed or an estimated value of the following airplane's speed, or an arbitrary value overestimating the following airplane's speed.

4. A method according to claim 3 in which the distance separating the first and the second configuration changes is less than or approximately equal to the sum of a distance Ddownstream downstream of the point of the first configuration change along the path of the airplane and a distance Dupstream upstream of the point of the second configuration change along the path of the airplane with:

Ddownstream=(Ds−ΔTps ×Vav)×Vpp-downstream/(Vav-Vpp-downstream), with the values of ΔTps and Vpp-downstream chosen from the propagation characteristics of the wake disturbance associated with the first configuration change;

Dupstream=(Ds−ΔTps ×Vav) ×Vpp-upstream/(Vav+Vpp-upstream), with the values of ATps and Vpp-upstream chosen from the propagation characteristics of the wake disturbance associated with the second configuration change.

5. A method according to claim 3 in which a {speed Vav–distance Ds} pair is chosen, from {speed–distance} pairs associated to different models of following airplanes envisaged, to determine the distances between the configuration changes so as to produce a protected space compatible with any one whatsoever of said different models of following airplanes envisaged.

6. A method according to claim 1 in which the configuration changes are realized by changes of position of mobile surfaces of airplane, and or by a change in the attitude of airplane during a landing.

7. A method according to claim 6 in which the configuration changes are realized along a path corresponding to an approach phase of airplane ending in a landing at a point Att such that the continuous protected space extends from a point of the approach path away from the point Att through to at least point Att.

8. A device for creating a continuous protected space along a path of an airplane, in which said protected space a maximum speed Vtc induced in a vortex of radius Rtc of a wake of airplane is reduced through increasing the radius Rtc of the vortex as a result of a wake disturbance, wherein the device comprises:

at least one memory in which are stored information representative of wake disturbance propagation characteristics along the vortex, in an upstream direction, opposite to a direction of movement of the airplane along the airplane path, and in a downstream direction, corresponding to a direction of movement of the airplane along the airplane path, triggered by changes of aerodynamic configurations of the airplane and information about the airplane and its environment;

means of calculation for generating, using information stored in the memory, instructions for successive changes of aerodynamic configurations of the airplane such that wake disturbances having the effect of increasing the radius Rtc of the vortex caused by said configuration changes are propagated along the vortex such that at least two successive configuration changes are separated on the airplane path by a distance such that spaces, in which effects of the wake disturbances resulting from each of said at least two configuration changes are propagated along the vortex during a predefined length of time, are separated by a distance along the airplane path of almost zero or overlap along the airplane path and create the continuous protected space along the airplane path, in which the maximum speed Vtc of the vortex is reduced because of the wake disturbance by at least a predefined value, after a predefined time.

9. A device according to claim 8 comprising means of generating an alarm signal when the configuration changes carried out do not conform to the configuration changes likely to create a continuous protected space.

* * * * *

UNITED STATES PATENT AND TRADEMARK OFFICE
CERTIFICATE OF CORRECTION

PATENT NO. : 8,336,827 B2
APPLICATION NO. : 12/738214
DATED : December 25, 2012
INVENTOR(S) : Jerome Journade It is certified that error appears in the above-identified patent and that said Letters Patent is hereby corrected as shown below:

Column 13, line 29, Claim 3, after the word "of" delete "a", therefore.

Column 13, line 52, Claim 4, delete "ATps" and insert -- $\Delta$Tps --, therefore.

Signed and Sealed this
Twelfth Day of March, 2013

Teresa Stanek Rea
*Acting Director of the United States Patent and Trademark Office*